Patented Oct. 16, 1934

1,976,732

UNITED STATES PATENT OFFICE 1,976,732

PHENOLIC DERIVATIVES OF DIARYL SULPHIDES

Treat Baldwin Johnson, Bethany, Conn., assignor to Sharp & Dohme, Incorporated, Philadelphia, Pa., a corporation of Maryland No Drawing. Application March 10, 1928, Serial No. 260,817. Renewed January 9, 1934

7 Claims. (Cl. 260—150)

This invention relates to an improved method for the production of phenolic and ethereal derivatives of diaryl sulphides, and includes new phenolic and ethereal derivatives of such sulphides.

The field of phenolic and etheral derivatives of diaryl sulphides has not been heretofore investigated, except to a very limited extent. Certain laboratory methods have been proposed for producing certain of these derivatives, but such methods are expensive or difficult, and the products which they give are in some cases impure and not adapted for use where products of high purity are required.

The present invention provides an improved process for producing phenolic and ethereal derivatives of diaryl sulphides in a simple and advantageous manner, and a process according to which products of high purity can be obtained. It includes the conversion of ethereal derivatives of diaryl sulphides to the corresponding phenolic derivatives in a form in which they may be readily purified to give products of high purity. The production of phenolic derivatives of high purity is particularly important because of the high toxicity of impurities usually present in the crude product.

The improved process of the present invention is a valuable process for producing those phenolic and ethereal derivatives of diphenyl sulphides which have heretofore been produced, in various degrees of crudeness or purity, by other methods. The new method is also a valuable method for the production of new derivatives of diphenyl sulphide and other diaryl sulphides which have not heretofore been produced, making possible the production of new and hitherto unknown derivatives.

The phenolic and ethereal derivatives of diaryl sulphides produced according to the present invention have the general formula R—S—R' where R and R' are aryl groups which may be the same or different, and where either R or R' or both is or are substituted by one or more phenolic or ethereal, e. g. alkoxy groups.

The simplest diaryl sulphide is diphenyl sulphide $C_6H_5$—S—$C_6H_5$. The phenolic derivatives of diphenyl sulphide include the isomeric ortho-, meta-, and para-mono-phenols, the various isomeric di- and other poly-phenols containing more than one phenolic group substituted in one of the aryl groups, or one or more phenolic groups substituted in each of the aryl groups. These monophenol and poly-phenol derivatives of diphenyl sulphide will be sufficiently illustrated by the para and ortho-hydroxy diphenyl sulphides and by the di-para and di-ortho-di-hydroxy diphenyl sulphides which have the following graphically represented formulae:

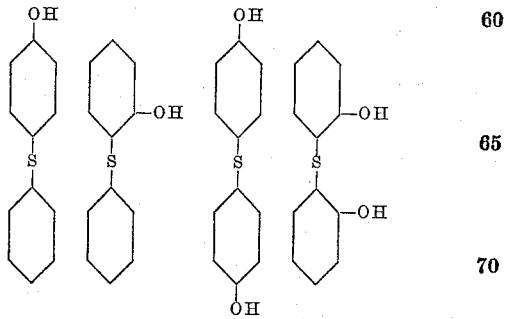

One or both of the aryl groups of the diaryl sulphides to which the phenolic groups or group is or are attached may also have one or more hydrogens substituted by other groups, such as methyl, ethyl, phenyl, ethoxy, methoxy, etc. or by substituents such as chlorine, bromine or iodine, a nitrogen-containing group, etc. In case a methyl group for example, is substituted in one or both of the aryl groups of the diphenyl sulphide, the resulting phenolic derivative will be a phenolic derivative of tolyl-phenyl sulphide or of ditolyl sulphide, there being various isomeric derivatives, depending upon the location of the methyl and phenolic groups in ortho, meta or para positions on one or both of the benzene rings of the phenyl groups. The monophenolic-derivatives of phenyl-tolyl sulphides may be represented either by the formula $CH_3.C_6H_4$—S—$C_6H_4.OH$ or the formula $C_6H_5$—S—$C_6H_3(CH_3)OH$. Similarly, in the case of diphenolic derivatives, both phenolic groups may be on the same phenyl or tolyl groups, or one on each. Similar mono or di- or other poly-phenolic derivatives may be made of ditolyl sulphides or of tolyl-xylyl sulphides, higher homologues, etc.

The ethereal derivatives of diaryl sulphides have the hydrogen of one or more of the hydroxyl groups of the phenols substituted by a hydrocarbon radical, such as alkyl (methyl, ethyl, etc.) aryl, or aralkyl.

According to the present invention, the ethereal derivatives of diaryl sulphides are produced by diazotizing an aromatic amine containing an ethereal or alkoxy group and coupling the diazotized amine with a thio-phenol, and decomposing the resulting diazo compound to form the alkoxy or ethereal derivative of the diaryl sulphide. Or the aromatic amine which is diazotized and coupled with the thio-phenol may be free from alkoxy or ethereal groups and the thio-phenol may contain such group or groups. The phenolic derivatives are obtained by converting the alkoxy or ethereal group into a phenolic group by means of a dealkylating or dearylating agent.

For example, in order to produce the para-hydroxy-diphenyl sulphide C₆H₅—S—C₆H₄—OH, para-anisidine CH₃—O—C₆H₄.NH₂(1,4) may be diazotized and the diazonium compound allowed to interact with an aqueous solution of a salt of thio-phenol, preferably the sodium or potassium compound, e. g. C₆H₅—SNa, with heating to remove nitrogen and form the para-methoxy diphenyl sulphide, and then demethylating the latter to form the para-hydroxy-diphenyl sulphide.

In a similar manner, the para-methoxy thio-phenol in the form of an alkali salt, preferably the sodium or potassium salt, e. g. CH₃O—C₆H₄—SNa, may be coupled in aqueous solution with diazo benzene with heating to remove nitrogen to form the methoxy derivative of diphenyl sulphide, which may then be demethylated to give the para-hydroxy-diphenyl sulphide C₆H₅S—C₆H₄OH.

These examples illustrating the reaction by which the para-hydroxy-diphenyl sulphide is formed can be changed by employing ethereal or alkoxy derivatives or other aryl amines or thio-phenols than aniline or simple thio-phenol. For example, in order to produce di-hydroxy phenols, or diphenolic derivatives of diaryl sulphides, two ethereal or alkoxy groups will be present attached to the amine or to the thio-phenol, or one to each. Similarly, if either of the aryl groups of the aromatic amine or thio-phenol is substituted with a methyl or other group, corresponding phenolic derivatives will be produced of phenyl-tolyl sulphide, or ditolyl sulphide, or other substituted aryl sulphides.

It is essential that either the amine or the thio-phenols contain a substituted phenolic group, such as an alkoxy or other ethereal groups, since the free phenolic or hydroxyl group does not permit of the application of the diazo reaction because of the tendency of the free phenolic groupings to couple with diazonium combinations to give dyes and resins. But by employing amines or thio-phenols in which a substituted phenolic group is contained, such as the methoxy or ethoxy or other ethereal group, the diazo reaction can be employed for diazotizing the amine and coupling the diazonium compound with the proper thio-phenol to form the ethereal derivative of the diaryl sulphide, after which the substituents of the ethereal group can be removed to give the free phenols by means of a dealkylating or dearylating agent.

The coupling of the diazonium salt with the alkali salt of the thio-phenol requires careful regulation and control, but when conducted properly gives an ethereal derivative of the diaryl sulphide which is easily purified and which on de-etherification (or dealkylation or dearylation enables the free phenol to be readily obtained in a state of high purity.

In preparing the ethereal derivatives, an aqueous solution of an aromatic diazonium salt containing a slight excess of free acid, preferably hydrochloric acid, is added gradually and carefully to a water or alkaline solution of an alkali salt of an aromatic thio-phenol or mercaptan, preferably a sodium or potassium salt. For the production of the para-hydroxy-diphenyl sulphide, the preparation of the ethereal intermediate may be illustrated graphically as follows:

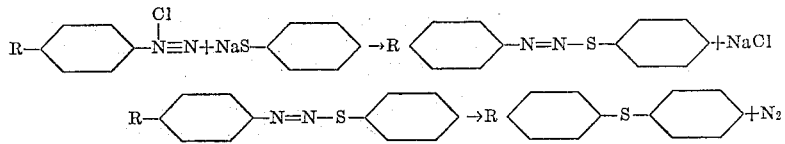

In the above reaction, R represents e. g. methoxy, ethoxy or other ethereal groups etc. A similar reaction occurs in the case of isomers, homologues, derivatives, etc. where the ethereal group may be attached to the thio-phenol or aromatic mercaptan instead of to the diazonium compound, and where either or both of the rings of the aryl group may be further substituted, e. g. with alkyl, aryl, aralkyl or halogen groups.

The intermediate diazo-thio-ether formed, according to the above reaction, is explosive if allowed to accumulate in large quantities, so that it is important to carry out the reaction under such conditions of temperature that the diazo-thio-ether is broken down as soon as formed, for example, at temperatures between 50 and 100° C. However, in the case of a diazonium salt which is not stable, for example, above 20° C. this lower temperature must be used, in which case the diazonium salt must be run into the aromatic mercaptan solution very slowly to allow the diazo-thio-ether opportunity to break down and so avoid its accumulation with ensuing possibility of an explosion.

After the coupling reaction has taken place, that is, after the formation of the diazo-thio-ether and its subsequent breaking down to give off nitrogen and to form the sulphide, the reaction mixture is preferably subjected to reduction as in acid solution with metallic zinc to change any disulphide formed to the original mercaptan and the mixture then purified by steam distillation to distill off such impurities volatile with steam as mercaptans, phenols, etc. The ethereal derivative, depending upon its nature, may then be extracted with organic solvents and further purified by crystallization if a solid, or by distillation if an oil.

The phenolic derivatives of diaryl sulphides may be prepared by dealkylation or dearylation of the corresponding ethereal derivatives. According to a preferred method of procedure the phenolic derivatives may be prepared by treating ethereal derivatives of diaryl sulphides with a solution of hydrobromic acid in acetic acid.

The phenolic derivatives of diaryl sulphides have remarkable germicidal properties. The improved process of the present invention enables these derivatives to be produced in a state of high purity such that their remarkable germicidal properties can be taken advantage of for antiseptic and other purposes.

The improved process of the invention will be further illustrated by the following specific examples, describing the production of para-methoxy-diphenyl sulphide, $$C_6H_5—S—C_6H_4—OCH_3(1,4),$$

ortho- methoxy-diphenyl sulphide, $$C_6H_5—S—C_6H_4—OCH_3(1,2)$$

and para methyl-para-methoxy-diphenyl sulphide, $(1,4)CH_3—C_6H_4—S—C_6H_4—OCH_3(1,4)$ and the dealkylation of these ethereal derivatives of the diaryl sulphides to form the phenolic derivatives, para-hydroxy-diphenyl sulphide, $C_6H_5—S—C_6H_4—OH(1,4)$, ortho - hydroxy - diphenyl sulphide $C_6H_5—S—C_6H_4OH(1,2)$ and para-methyl-para-hydroxy-diphenyl sulphide $(1,4)CH_3—C_6H_4—S—C_6H_4OH(1,4)$ respectively. In the processes of these examples, the methoxy-diphenyl sulphide combination is first formed. The parts are by weight.

*Example I.*—10 parts of para-anisidine (1 mol.) are dissolved in 15 parts of concentrated hydrochloric acid (2 mols.) and the solution diluted with water. The amine is then diazotized with sodium nitrite. 13.2 parts of sodium thio-phenate is dissolved in 50 parts of water and the solution heated to 70° C. The prepared diazo solution is slowly added to this heated solution, with agitation of the mixture to insure intimate contact and uniform distribution and reaction. Under these conditions, the coupling takes place with decomposition of the intermediate diazo-thio-ether and formation of the para-methoxy-diphenyl sulphide. After the reaction is completed, the solution is acidified with hydrochloric acid and then granulated zinc is added to reduce any disulphide formed as a by-product. The mixture is then steam distilled and the excess thio-phenol, etc. is removed and the thio-phenol may be recovered. The solution is then cooled, extracted with ether, the ether extract washed with alkali and then with acid and finally dried over sodium sulphate or calcium chloride. After distillation of the ether, the para-methoxy-diphenyl sulphide is further purified by distillation under diminished pressure.

*Dealkylation.*—The methoxy-diphenyl sulphide is then subjected to demethylation by heating, for example, with hydrobromic acid in glacial acetic acid solution at a temperature of about 80 to 90° C. for a sufficient period of time, e. g. around 4 to 6 hours, using about 1 to 2 mols. of hydrobromic acid for each mol. of the methoxy-diphenyl sulphide. Excess of hydrobromic acid and acetic acid is then driven off and sodium hydroxide solution added. The alkaline solution is then heated at steam bath temperature to hydrolyze any acetylated product formed during the process of demethylation and finally extracted with ether to remove any of the unaltered methylated compound. The alkaline solution is then acidified and the liberated phenol extracted with ether. The ether extract is dried, e. g. with calcium chloride, the ether distilled off, and the para-hydroxy-diphenyl sulphide is then fractionally distilled under diminished pressure. The boiling point is about 168–172° C. at 4 mm. For further purification, the para-hydroxy-diphenyl sulphide is recrystallized from petroleum ether. The purified product has a melting point of 50–51° C. This purified compound is odorless, colorless and tasteless. It is readily soluble in ether, benzene, and alcohol (ethyl, methyl, isopropyl and propyl). It is only very slightly soluble in water and petroleum ether and is slightly hygroscopic. Petroleum ether may be employed for its recrystallization.

This compound, i. e. the para-hydroxy-diphenyl sulphide gives a strong reaction with Millon's reagent but does not respond to a color test with ferric chloride solution. The refractive index is 1.6490 at 23° C. The germicidal coefficient, using phenol as the standard unit for comparison by the Department of Public Hygiene method, is about 115, employing B. typhosum as the bacteria for establishing this coefficient.

I am aware that attempts have been made to produce the para-hydroxy-diphenyl sulphide, but so far as I am aware this compound has not heretofore been produced free from objectionable impurities of high toxicity. Accordingly, I consider the purified product, free from such objectionable impurities, and having the important advantages which the purified product has, to be a new product, and I accordingly claim this product as a new product.

In the process of the specific example above, other reactions may take place unless proper precautions are observed. For example, the diazonium compound derived from para-anisidne may be decomposed or hydrolyzed by water, with elimination of nitrogen and setting free of hydrochloric acid and formation of the para-methoxy phenol. This decomposition reaction is kept at a minimum by working at a low temperature which will vary somewhat for different diazonium salts. The desired reaction is that in which the diazonium compound combines with the thiophenol to form the diazo-thio-ether, and in which this is decomposed with elimination of nitrogen to form the methoxy-diphenyl sulphide. The higher the temperature, the quicker the decomposition and removal of nitrogen is brought about, and, by carrying out the combination of the diazonium compound with the alkali salt of thiophenol at a temperature of about 70° C. the decomposition with removal of nitrogen follows immediately, thus avoiding an accumulation of the diazo-thio-ether, and so minimizing the chance of a possible explosion which may take place at lower temperatures unless care is used. The intermediate diazo-thio-ether may also decompose in part, unless precautions are taken, to separate thio-phenols and yield the diazonium hydroxide according to the following equation:

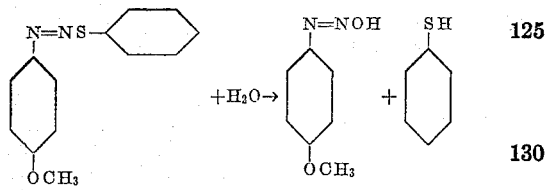

The reaction represented by this equation takes place simultaneously with the formation of the methoxy-diphenyl sulphide from the intermediate diazo-thio-ether, but it is kept at a minimum by avoiding a high concentration of hydrogen ions in the reacting media.

*Example II.*—10 parts of ortho-anisidine (1 mol.) are dissolved in 15 parts of concentrated hydrochloric acid (2 mols.) and the solution diluted with water. The amine is then diazotized as usual with sodium nitrite. 13.2 parts of sodium thio-phenate are dissolved in 50 parts of water and the solution heated to 70° C. The prepared diazo solution is slowly added to this heated solution, with agitation of the mixture to insure intimate contact and uniform distribution and reaction. Under these conditions the coupling takes place with decomposition of the inintermediate diazo-thio-ether and formation of the ortho-methoxy-diphenyl sulphide

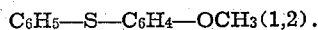
$C_6H_5—S—C_6H_4—OCH_3(1,2)$.

The same procedure is then followed as described in Example I and the methoxy compound finally purified by distillation under diminished pressure. The boiling point is 151–153° C. at 3 mm.

*Dealkylation.*—The dealkylation operation is carried out in accordance with the directions given in Example I. The boiling point of the ortho-hydroxy-diphenyl sulphide $C_6H_5—S—C_6H_4OH(1,2)$ is 138–140° C. at 4 mm. The refractive index is 1.6380 at 22° C. The phenol possesses practically the same solubility as the para-homologue described in Example I. It is a colorless oil at ordinary temperature.

*Example III.*—50 parts of para-anisidine (1.25 mols.) are dissolved in 85 parts of concentrated hydrochloric acid (2.5 mols.) and the solution diluted with water. The amine is then diazotized as usual. 53 parts of sodium thio-cresolate (1 mol.) are dissolved in 100 parts of water containing 13 parts of sodium hydroxide and the solution heated to 70° C. The prepared diazo solution is slowly added to this heated solution, with agitation to insure intimate contact and uniform distribution and reaction. Under these conditions coupling takes place with decomposition of the intermediate diazo-thio-ether and formation of para-methyl-para-methoxy diphenyl sulphide,

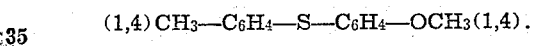
$(1,4)CH_3—C_6H_4—S—C_6H_4—OCH_3(1,4)$.

This was obtained as a colorless crystalline compound melting at 45–46° C. and boiling at 181–184° C. at 4 mm.

*Dealkylation.*—The dealkylation operation is accomplished by heating with hydrobromic acid in acetic acid solution, but for a complete reaction it was found necessary to continue the heating for about eight hours. Otherwise no departure was made from the practice described in Examples I and II. The boiling point of para-methyl-para-hydroxy-diphenyl sulphide is 178–180° C. at 3 mm. The compound melts at 67–68° C.

The para-methyl-para-hydroxy-diphenyl sulphide and the method of producing it is claimed in a divisional application Serial No. 706,408, filed January 12, 1934.

Other alkoxy or ethereal derivatives of aniline, toluidine, xylidine and higher homologues and derivatives, etc. can be employed, or instead of employing unsubstituted thio-phenol substituted thio-phenols can be employed. Various derivatives, such as halogen derivatives, etc. can be employed to form their companion ethereal and phenolic compounds. In this way it is possible to produce a large number of isomeric, homologues and substituted ethereal and phenolic derivatives of diphenyl and other diaryl sulphides, such as those hereinbefore referred to.

These phenolic derivatives of diaryl sulphides include besides Examples I, II and III, many derivatives which are new and which are of importance and which have remarkable germicidal properties. Insofar as I am aware, the only phenolic derivatives of diaryl sulphides which have been heretofore produced and described, in varying states of impurity or purity, are the para and ortho-hydroxy derivatives of diphenyl sulphide and the di-para and di-ortho derivatives of diphenyl sulphide. The new phenolic derivatives of diaryl sulphides include other isomeric mono and di-hydroxy phenols or phenolic derivatives of diphenyl sulphide containing, for example, two phenolic groups on the same aryl group and either with or without one or more phenolic groups on the other phenyl group of the diphenyl sulphide. The new phenolic derivatives include mono and diphenolic derivatives of tolyl and other substituted diaryl sulphides, such as mono and diphenolic derivatives of tolyl-phenyl sulphide, of ditolyl sulphide, etc. and various isomeric mono and diphenolic derivatives thereof. When other substituents are contained in one or both of the aryl groups, other new phenolic derivatives are produced.

The new ethereal derivatives of diaryl sulphides include the compounds of this series which have hitherto been unknown, such as the alkyl and aryl ethers of mono-, di-, and poly-hydroxy derivatives of diphenyl sulphide, in which one, two or more ethereal groups may occur on either or both of the phenyl groups coupled to the sulphur atom, and hydroxy derivatives of other aryl sulphides or substituted aryl sulphides, such as tolyl-phenyl sulphide, or di-tolyl sulphide, or nitro or halogen, etc. derivatives thereof. When other constituents are contained in one or both of the aryl groups linked with the sulphur, other new ethereal derivatives are produced.

It will thus be seen that the present invention provides a new and improved process of more or less general application for the production of phenolic derivatives of diaryl sulphides, by which a large number of new phenolic derivatives can be produced.

I claim:—

1. The method of producing phenolic derivatives of diaryl sulphides which comprises diazotizing an aromatic amine and coupling the diazonium compound with a thio-phenol, either the aromatic amine or the thio-phenol having an ethereal group united thereto, decomposing the intermediate diazo-thio-ether to form an ethereal derivative of a diaryl sulphide, and deetherifying the same to produce the phenolic derivatives of the diphenyl sulphides.

2. The method of producing phenolic derivatives of diaryl sulphides which comprises diazotizing an aromatic amine having an ethereal substituent, combining the resulting diazonium compound with a thio-phenol, decomposing the intermediate diazo-thio-ether to form an ethereal derivative of a diaryl sulphide, and de-etherifying the same to produce the phenolic derivative of the diaryl sulphide.

3. The method of producing phenolic derivatives of diaryl sulphides which comprises diazotizing an aromatic amine, coupling the diazonium compound with a thio-phenol having an ethereal substituent, decomposing the intermediate diazo-thio compound to form an ethereal derivative of a diaryl sulphide, and de-etherifying the same to produce the phenolic derivative of the diphenyl sulphide.

4. The method of producing phenolic derivatives of diaryl sulphides which comprises de-etherifying the corresponding ethereal derivative of the diaryl sulphide by heating the same with a mixture of hydrobromic acid and acetic acid.

5. The method of producing phenolic derivatives of diphenyl sulphides which comprises de-alkylating the corresponding alkoxy derivative of diphenyl sulphide by heating the same with a mixture of hydrobromic acid and glacial acetic acid.

6. The method of producing parahydroxy-diphenyl sulphide which comprises diazotizing a substituted aniline having an ethereal substituent in para position to the amino group, combining the resulting diazonium compound with thio phenol, decomposing the intermediate diazo-thio-ether to form an ethereal derivative of diphenyl sulphide and de-etherifying the same to produce the parahydroxy-diphenyl sulphide.

7. As a new product, the para-hydroxy-diphenyl sulphide, being a crystalline product having a melting point of about 50-51 C. and being a colorless, odorless compound readily soluble in ether, alcohol and benzene and only slightly soluble in water and petroleum ether.

TREAT BALDWIN JOHNSON.